(12) United States Patent
Williams et al.

(10) Patent No.: US 9,584,526 B2
(45) Date of Patent: Feb. 28, 2017

(54) ANONYMOUS DISCUSSION FORUM

(71) Applicant: BetterCompany Inc., San Francisco, CA (US)

(72) Inventors: Thomas Joseph Lloyd Williams, San Francisco, CA (US); Colin Walpole Putney, San Francisco, CA (US); Caroline Lukins, Lafayette, CA (US); Omar Amin, Springfield, VA (US)

(73) Assignee: BetterCompany Inc., San Francisco, CA (US)

( * ) Notice: Subject to any disclaimer, the term of this patent is extended or adjusted under 35 U.S.C. 154(b) by 0 days.

(21) Appl. No.: 14/941,117

(22) Filed: Nov. 13, 2015

(65) Prior Publication Data
US 2016/0294836 A1    Oct. 6, 2016

Related U.S. Application Data

(60) Provisional application No. 62/143,724, filed on Apr. 6, 2015.

(51) Int. Cl.
| | |
|---|---|
| *H04L 29/06* | (2006.01) |
| *H04L 12/58* | (2006.01) |
| *H04L 29/08* | (2006.01) |
| *G06Q 10/10* | (2012.01) |
| *G06Q 50/00* | (2012.01) |

(52) U.S. Cl.
CPC ......... *H04L 63/102* (2013.01); *G06Q 10/107* (2013.01); *G06Q 50/01* (2013.01); *H04L 51/16* (2013.01); *H04L 51/32* (2013.01); *H04L 63/0421* (2013.01); *H04L 67/12* (2013.01); *H04L 67/303* (2013.01); *H04L 67/306* (2013.01)

(58) Field of Classification Search
CPC .................................................. H04L 63/102
USPC ............................................................ 726/4
See application file for complete search history.

(56) References Cited

U.S. PATENT DOCUMENTS

| | | | |
|---|---|---|---|
| 8,862,679 B1 | 10/2014 | Byttow et al. | |
| 8,959,440 B2 * | 2/2015 | Pike | ........................ H04L 51/04 715/753 |
| 9,069,856 B1 | 6/2015 | Lilot et al. | |
| 2005/0021750 A1 | 1/2005 | Abrams | |

(Continued)

OTHER PUBLICATIONS

Darkchat—Dec. 8, 2014, feature printout from itunes.apple.com/su/app/darchat-chat-undercover-share/, 3 pages.

(Continued)

*Primary Examiner* — Longbit Chai
(74) *Attorney, Agent, or Firm* — Goodwin Procter LLP

(57) ABSTRACT

Methods, systems, and apparatus, including computer programs encoded on a computer storage medium, for enabling anonymous posting of content, e.g., over a network (e.g., the internet). In some instances, users may inform a system of various attributes of the user, for example, job title, skills, and/or interests. The system may group similar users together. In some cases, users grouped together can see messages posted by the other users in the group in an anonymous discussion forum. In other cases, users grouped together can have other users in the group presented to them as potential options of users to follow, e.g., as part of an anonymous social media platform. In some implementations, users can identify particular user subsets to view posted content.

22 Claims, 13 Drawing Sheets

(56) References Cited

U.S. PATENT DOCUMENTS

| | | |
|---|---|---|
| 2011/0208822 A1 | 8/2011 | Rathod |
| 2012/0066618 A1 | 3/2012 | Barker et al. |
| 2012/0089691 A1 | 4/2012 | Kim |
| 2012/0323909 A1 | 12/2012 | Behforooz et al. |
| 2014/0379729 A1* | 12/2014 | Savage .................. H04L 51/26 707/748 |
| 2015/0256634 A1* | 9/2015 | Bastide .................. G06Q 50/01 709/204 |

OTHER PUBLICATIONS

International Search Report and Written Opinion issued in PCT/US2016/026008, mailed on Jun. 29, 2016 (10 pages).

* cited by examiner

# ANONYMOUS DISCUSSION FORUM

CROSS-REFERENCE TO RELATED APPLICATION

This application claims priority to and the benefit of U.S. provisional patent application Ser. No. 62/143,724, titled "Anonymous Discussion Forum," filed on Apr. 6, 2015, the disclosure of which is herein incorporated by reference in its entirety.

TECHNICAL FIELD

This specification relates to anonymous content posting and, in particular, to the anonymous exchange of content in online forums such as, e.g., discussion forums and social media platforms.

BACKGROUND

An online discussion website such as a message board, or a social media website, provides an online forum where users of the website can hold discussions by posting messages. In message boards, messages posted for a particular topic can be grouped into a thread, often referred to as a conversation thread. A user interface (e.g., a web page) for an online forum can contain a list of threads or topics. Each thread can be expanded to a list of messages, often arranged in a chronological order. Each message typically comprises a text message, a time stamp, and an author identified by a real name or a user name (e.g., for an account of the online forum). In social media websites, users are typically followed by other users and/or select other users to follow. In this context, "follow" means being able to see content posted by the followed user. Users typically select other users to follow based on the identity of the other users, which is provided by the social media platform, e.g., by providing a real name, a user name, and/or a picture.

SUMMARY

In general, one aspect of the subject matter described in this specification can be embodied in methods that include the actions of identifying a first group of users of a plurality of users, where each of the users in the first group has a respective likeness score in relation to a first user that satisfies a threshold, and where each user of the first group is permitted to send anonymous messages through a respective account to the first user; identifying a plurality of first anonymous messages received in an account of the first user, each first message having been authored by a respective user of the first group; and obtaining user input of the first user indicating a negative response to a particular first message and, based thereon, removing an author of the particular first message from the first group such that the author is no longer permitted to send messages to the first user through the account of the author. Other embodiments of this aspect include corresponding systems, apparatus, and computer programs.

These and other aspects can optionally include one or more of the following features. The aspect can further comprise, after removal of the author from the first group, determining respective likeness scores of one or more particular users in relation to the first user and, based thereon, adding the particular users to the first group or removing the particular users from the first group. Removing the particular users from the first group can further comprise determining that respective likeness scores of the particular users no longer satisfy the threshold and, based thereon, removing the particular users from the first group such that the removed particular users are no longer permitted to send messages to the first user through their respective accounts. Adding the particular users to the first group can further comprise determining that a second group of one or more of the plurality of users have respective likeness scores that satisfy the threshold after removal of the author from the first group, and adding the second group of users to the first group of users such that each user of the second group is permitted to send anonymous messages through a respective account to the first user. Determining the respective likeness scores of the particular users in relation to the first user can comprises identifying one or more discriminating attributes, obtaining a weighted vector of attributes for the first user and for each of the particular users, adjusting a respective weight of the discriminating attributes in each of the vectors, and calculating the respective likeness score of each of the particular users as a difference between the weighted vector of attributes of the particular user and the weighted vector of attributes of the first user. Identifying one or more discriminating attributes can comprise identifying one or more discriminating attributes of the author. Identifying the discriminating attribute can comprise clustering the plurality of users based on respective attributes of the users to identify the discriminating attributes that influence cluster membership. Clustering can comprise, for different pairs of users of the plurality of users, calculating a respective distance between the users of the pair based on the respective attributes of the users in the pair, and clustering users based on the distances. A particular attribute can comprise one or more respective anonymous answers, submitted through respective accounts of the particular users to one or more questions submitted through the account of the first user. A particular attribute can comprise a profession, a company, time of employment, location of employment, or an attribute that is unrelated to employment. A particular attribute can comprise a respective positive response to an anonymous message through an account of a user.

In general, another aspect of the subject matter described in this specification can be embodied in methods that include the actions of receiving profile information from a plurality of users, the profile information comprising at least one attribute of each user; providing to a first user options of other users for the first user to follow without revealing the identity of the other users; receiving a message posting from the first user; and providing the first user with an option to select a subset of the plurality of users that can view the message posting. In some cases, the other users have at least one attribute in common with the first user. In other cases, the other users all share a common attribute (e.g., a job title). Other embodiments of this aspect include corresponding systems, apparatus, and computer programs.

These and other aspects can optionally include one or more of the following features. The at least one received attribute may include a job title and/or a personal characteristic. The personal characteristic may relate to how a user performs their job (e.g., a parental status, a political status, a religious status, an immigrant status, etc.). In some cases, the identified subset can include users that follow the first user. In some cases, the identified subset can include users that have at least one attribute in common with the first user. In certain instances, the received attribute can include a first attribute and a second attribute, and the identified subset can include users that have both the first attribute and the second attribute in common with the first user. In some cases, the identified subset can include users that have a particular attribute (e.g., a job title) that is different that the first user. In some instances, the received attribute can include a place of employment, and the identified subset can include colleagues of the first user. The method can further include the action of displaying the message posting to the subset of the plurality of users identified by the first user, without revealing the identity of the first user. The displaying step may include presenting a first avatar associated with the first user. The method can further include the actions of receiving at least one comment posting from the first user on the message posting; displaying the at least one comment posting along with the first avatar; receiving a second message posting from the first user; and displaying the second message along with a second avatar, such that a user viewing the message posting and the at least one comment posting can determine from the first avatar that they are both posted by the same user, while a user viewing the message posting and the second message posting cannot determine that they are both posted by the same user. In some instances, the displaying step further includes the action of indicating to a user viewing the message posting that the message posting was received from a user that has a particular attribute (e.g., a job title) that is different than the viewing user.

In general, another aspect of the subject matter described in this specification can be embodied in methods that include the actions of: receiving at least one message posting from a posting user; assigning a topic tag to the message postings; and determining a topic reputational score for the posting user based on an amount of feedback received on the message postings and the topic reputational scores of the other users providing feedback. In some instances, the method can further include identifying other users interested in the topic; and presenting the message postings to the other users at a location based on the topic reputational score of the posting user. Other embodiments of this aspect include corresponding systems, apparatus, and computer programs.

Particular implementations of the subject matter described in this specification can be implemented to realize one or more of the following advantages. The system described herein enables content to be exchanged anonymously, e.g., a part of an anonymous discussion forum and/or an anonymous social media platform. The system may automatically form a group of like users based on similarity in respective attributes of users of the system. Users of the system can define their own attributes in forms of questions and corresponding answers. Each user in a group of like users can send anonymous messages through a respective account to other users in the group. Membership in a group of like users can be automatically updated over time by the system. Membership in the group of like users can be automatically updated based on one user's negative response to another user's anonymous message, for example. The anonymous social media platform can provide users with options of other users to follow without revealing the identity of the other users. The platform can allow a particular user to select a subset of other users that can view a message posted by the particular user.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings generally indicate like elements.

DETAILED DESCRIPTION

Figure 1:
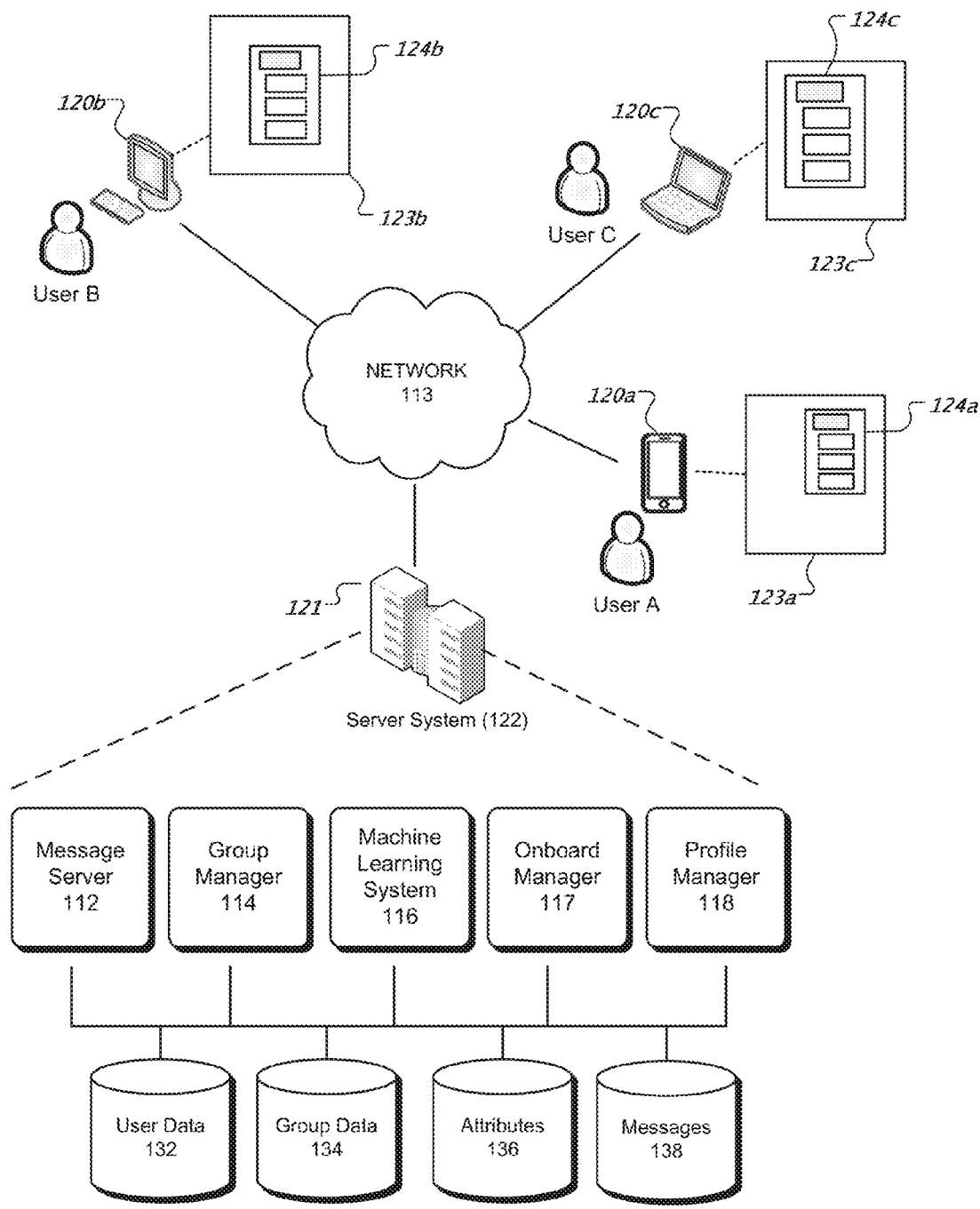
FIG. 1 illustrates an example system for anonymous content posting.

FIG. 1 illustrates an example system for anonymous content posting implemented by a server system 122. The server system 122 provides functionality for posting anonymous messages and grouping like users. The server system 122 comprises software components and databases that can be deployed at one or more data centers 121 in one or more geographic locations, for example. The server system 122 software components may include a message server 112, group manager 114, machine learning system 116, onboard manager 117, and/or profile manager 118. The software components can comprise subcomponents that can execute on the same or on different individual data processing apparatus. The server system 122 databases may include a user data database 132, group data database 134, attributes database 136, and messages database 138. The databases can reside in one or more physical storage systems. Example features of the software components and data processing apparatus will be further described below.

The message server 112 is a software component that may send and receive anonymous messages to and from users' client devices through one or more data communication networks 113 such as the Internet, for example. A user of the system 122 can access a user interface (e.g., user interface 124a) of a client application (e.g., client application 123a) such as a web browser or a special-purpose software application executing on the user's client device (e.g., client device 120a) to access the anonymous content posting forum implemented by the server system 122. Although this application will describe many functions as being performed by system 122, in various implementations, some or all functions performed by system 122 may be performed locally by a client application (e.g., client application 123a). The client application can communicate with the message server 112 using Hypertext Transfer Protocol (HTTP), another standard protocol, or a proprietary protocol, for example. A client device (e.g., 120a, 120b, 120c) can be a mobile phone, a smart watch, a tablet computer, a personal computer, a game console, or an in-car media system. Other types of client devices are possible. The system 122 of FIG. 1 can enable several anonymous content posting functions, described in more detail below.

In various implementations, the system 122 can enable an anonymous discussion forum. A user can submit messages to the system 122 for other users in a group of users that are similar to the user to view and respond to. Each user of the system 122 can have an individual account with the system 122 through which they can submit and receive messages. In some cases, submitted messages are automatically shared with users in the user's group.

A given pair of users can be similar to each other if their respective characteristics or attributes are, in the aggregate, determined to be similar to a satisfactory degree. Membership in a group of similar users can change over time and can be determined automatically by the system 122. The details of identifying attributes of users, determining likeness between users based on attributes, and determining a group of like users will be further described below.

By way of illustration, a user of a client device (e.g., client device 120*a*) can submit a new message to the user interface (e.g., user interface 124*a*) of a client application (e.g., client application 123*a*) executing on the client device. The client application can transmit the new message to the message server 112 which can store the message in message database 138 along with a time stamp indicating when the message was submitted by the user, an identifier of the user (or user account) that submitted the message, and an identifier of a conversation thread that the message belongs to (if any). A message can comprise text, image content, video content, audio content, multimedia content, or a combination of these. The identifier of the user can be an internal identifier of the user's account on the server system 122, for example. The identifier of the conversation thread may include a topic such as the subject of the conversation and, optionally, an indication of whether the message is the first message of the conversation thread or is a follow-up message. In various implementations, the message server 122 removes from the new message any real-world identification information (e.g., name, phone number, email address, mailing address) that the user may have entered, before storing the new message in the messages database 138. In one implementation, the message server 122 discards new messages including real-world identification information and does not store them in the messages database 138. The message server 122 then makes the new message available for viewing by users in the user's group.

A user of the system 122 can, through a user interface (e.g., user interface 124*b*) of a client application (e.g., client application 123*b*) running on the user's client device (e.g., client device 124*b*), retrieve messages for one or more conversation threads started by the user or by users in the user's group. The client application can send a request to the system 122 to retrieve the messages. In response to the request, the message server 112 can obtain the requested messages from the messages database 138 and, before sending them to the requesting client device, strip the messages of all identifying information, such as the identifiers of the users that authored the messages, so that the user will not know, for any given message, who the author of the message is. Upon receiving the anonymous messages, the client application displays in its user interface the anonymous messages (in one or more conversation threads), as shown for example in FIG. 2.

Figure 2:
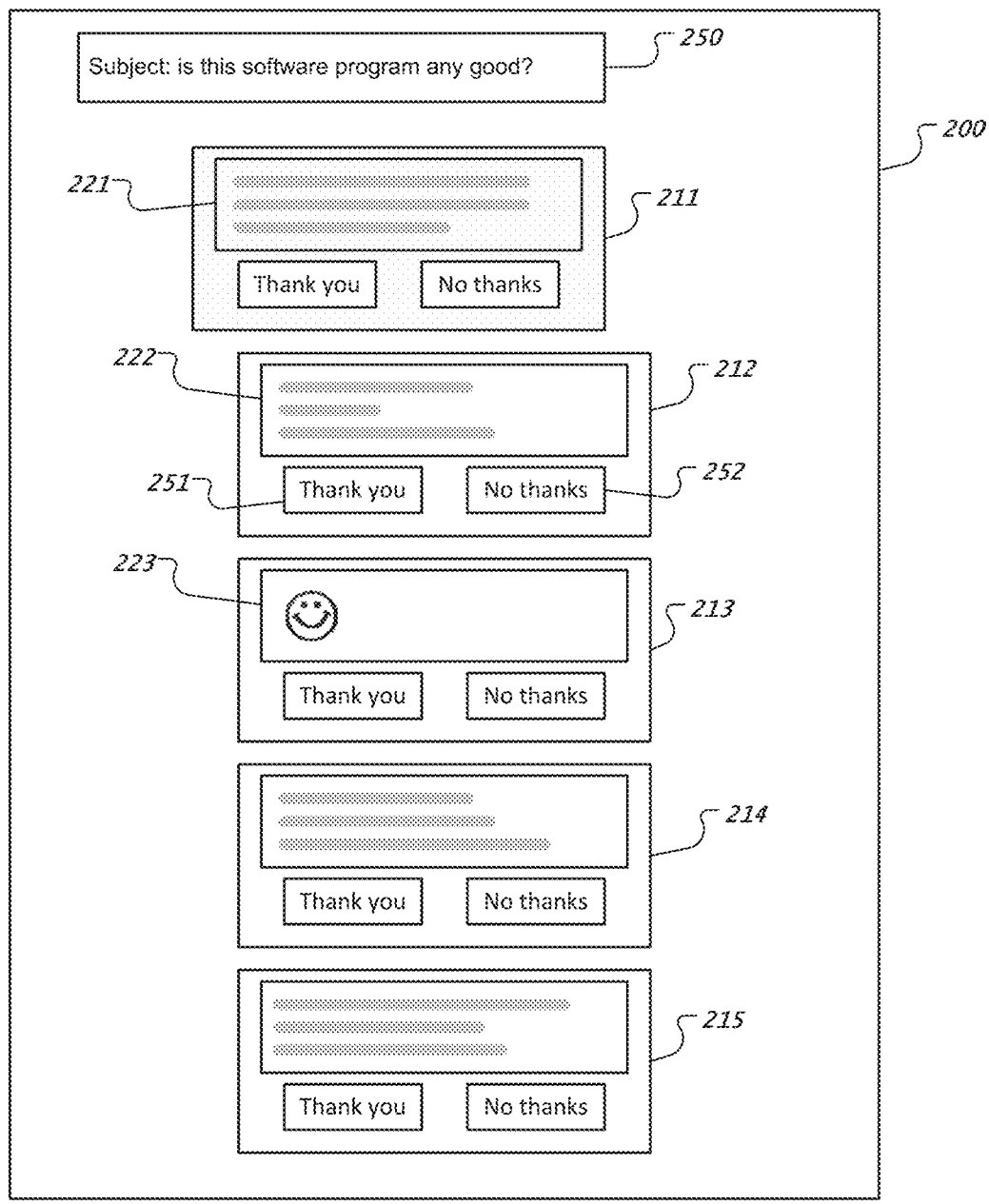
FIG. 2 illustrates an example user interface for a conversation thread in an anonymous discussion forum.

FIG. 2 illustrates an example user interface 200 for presenting a conversation thread. The user interface 200 displays a conversation thread including anonymous messages 211, 212, 213, 214, and 215. Each anonymous message includes message content (e.g., 221, 222, 223) such as text or image content. The user interface 200 can also include a subject or topic (e.g., 250) of the conversation thread. Note that identifying information such as user identifiers are absent in the messages of the conversation thread. By removing identifying information from messages provided to users, the message server 112 enables anonymous message exchanges between users of the system 122 through their respective user accounts. For instance, user A can submit a message as part of a conversation thread started by user B. User B can view the particular message authored by user A without knowing the identity of user A, since no identifying information is provided by the message server 112 to user B. In this way, user A effectively sent an anonymous message to user B through user A's account on the system 122.

In some implementations, and as illustrated in FIG. 2, each anonymous message in the user interface 200 can also include a selectable icon (e.g., 251) for the viewing user to provide a positive response to the message (e.g., "Thank you"), and a selectable icon (e.g., 252) for the user to provide a negative response to the message (e.g., "No thanks") In response to the user's selection of a positive or negative response to a particular anonymous message (e.g., 214), the client application displaying the user interface 200 transmits the response, an identifier of the particular anonymous message, and an identifier of the user, to the message server 112. The message server 112 can, based on the identifier of the particular anonymous message, access the messages database 138 to determine the author of the particular anonymous message. The message server 112 can store in the attributes database 136 the response, in reference to the user and the author. That is, the message server 112 can store in the attributes database 136 an attribute of the user's positive or negative response (described below) to the author of the particular anonymous message. In some implementations, the message server 112 provides, for a particular response, an anonymous acknowledgement message to the author of the particular anonymous message. The anonymous acknowledgement message may be created without the identifying information of the user providing the response (e.g., "Someone has thanked you for your comment."). For instance, the message server 112 can send a text message with the anonymous acknowledgement message to the author of the particular anonymous message. As another example, the message server 112 can post the anonymous acknowledgement message in a user interface for the anonymous discussion forum that the author of the particular anonymous message can access from his/her client device.

In various implementations, the user interface 200 for presenting a conversation thread can include an indication of a number of messages in the conversation thread. The user interface can also include an indication of a number of positive and/or negative responses (e.g., on messages of the conversation thread) that a viewer of the conversation thread had submitted to the system 122.

In some implementations, the group manager 114 can update membership of a group of like users in relation to a user in response to changes of one or more attributes associated with the user or one or more like users in the group. For example, when the system 122 receives from the user an indication of a negative response to a particular user's anonymous message in a conversation thread, the group manager 112 may remove the particular user from any group of like users in relation to the user, e.g., permanently or for an extended period of time (e.g., three months). In this example, the user effectively "banishes" the particular user from his/her group of like users, and the user will not see anonymous messages authored by the particular user again (or at least for an extended period of time); that is, the particular user is no longer permitted to send anonymous messages to the user through the particular user's account on the anonymous discussion forum implemented by the system 122. In various implementations, after the particular user is banished by the user, a third user in the user's group can see a strike-out or gray-out copy of the particular user's message in the conversation thread, indicating the message has been banished from the conversation thread. In this way, the third user can ignore the banished message while commenting on the conversation thread.

Figure 3:
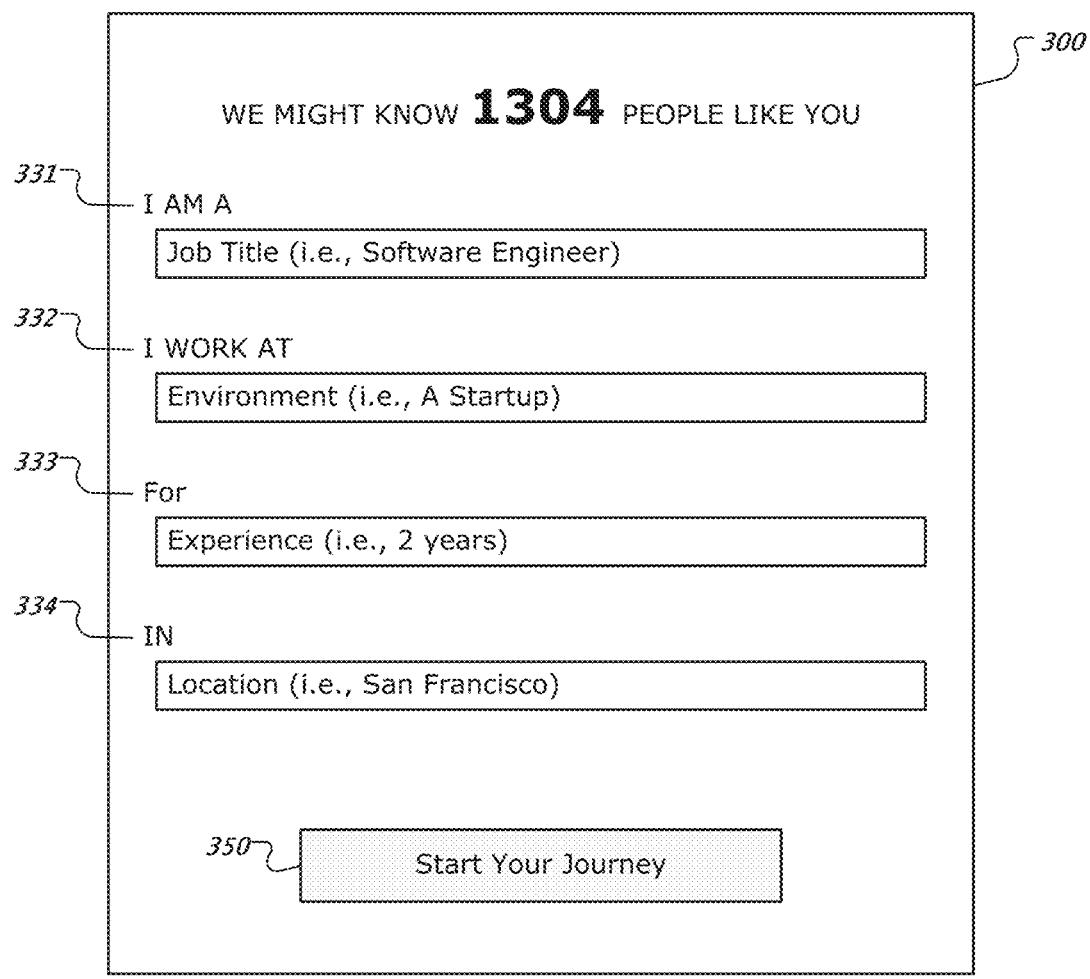
FIG. 3 illustrates an example user interface for enrolling a user in an anonymous content posting system.

A user can enroll with the system 122 by submitting a phone number to the system, for example. Other types of enrollment information are possible including email addresses. In reference to FIG. 1, the onboard manager 117 is a software component that may manage enrollment of users. The onboard manager 117 can provide a web page to a user's client device that requests information from the user, for example, as illustrated by a graphical user interface 300 in FIG. 3. The graphical user interface 300 is an example user interface for enrolling the user to the system 122. The user can access the graphical user interface 300 in a browser window of a web browser running on the user's client device. A user interface for enrolling the user to the anonymous discussion forum can also be presented to the user by a client application (e.g., client application 123a) of the user, for example. In addition to requesting a phone number, the graphical user interface 300 may request the user to answer a plurality of questions that ask for one or more attributes of the user. For example, the questions can ask the user for his/her profession (331), company (332), time of employment (333), and location of employment (334). The attribute questions can inquire about attributes that are unrelated to employment such as, for example, a favorite hobby, favorite food, and a location the user often goes to besides home and work. The graphical user interface 300 (or a user interface presented by a client application) can also let the user select a particular category (e.g., work, leisure, sports, food) and ask the user attribute questions corresponding to the selected category (e.g., "What sports do you play every week?", "What is your favorite sports team?", "Who was your favorite athlete when you growing up?"). Other attribute questions are possible.

The user can join the system 122 by, for example, providing a phone number and answers to the attribute questions (e.g., "A start-up company", "I'm the CTO", "2 years", "San Francisco"). An answer to an attribute question can be unstructured text. Upon receiving an indication from the user (e.g., by selecting a submit icon 350), the web browser displaying the onboarding user interface 300 can transmit the phone number and answers (e.g., attributes) to the onboard manager 117. The onboard manager 117 may create a user account record for the user based on the phone number and store the user account record in the user data database 132. In some implementations, a user's phone number (e.g., his/her real-world identification information) is stored in a separate database that provides mapping between the user's phone number and an internal identifier of the user. In such cases, only the internal identifier of the user may be stored in the user data database 132, group data database 134, attributes database 136, and messages database 138, for referencing the user's data in these databases. In addition, the onboard manager 117 may store the attributes (e.g., the user's answers to the attribute questions) in the attributes database 136. The system 122 can determine whether two users are similar based on these attributes (described further below). In some instances, the user's phone number (e.g., the user's identity) and attributes are not provided to another user by the system 122.

Figure 4A:
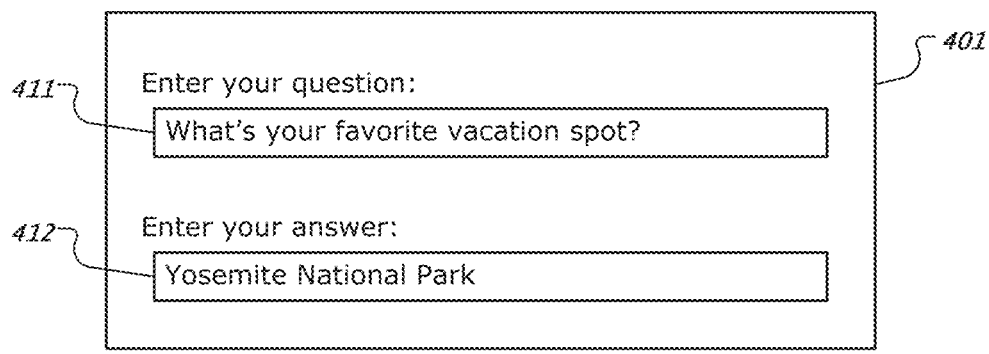
FIGS. 4A and 4B illustrate example user profile forms.

In reference to FIG. 1, the profile manager 118 is a software component that may manage profiles for users of the system 122. A profile can be a collection of one or more attributes of a user. In some instances, instead of asking every system user for information of pre-determined attributes (e.g., home city, work city, age, schools attended, and so on), the profile manager 118 provides to a user a user profile form (e.g., a web page) that allows the user to create a question and provide an answer to his/her own question. That is, in such instances, each attribute is a pair of a question and a corresponding answer. This allows a user to define his/her own attributes, in addition to the attributes described in reference to FIG. 3. A question and its corresponding answer in a question-answer attribute can be unstructured text. FIG. 4A is an example user profile form 401. For example, the user can create a question "What is your favorite vacation spot?" (411) and provide an answer "Yosemite National Park" (412). The user can create questions and provide corresponding answers in a user profile form displayed in a browser window of a web browser running on the user's client device. After receiving from the user an indication of completing the user profile form (e.g., after detecting the "Enter" keystroke in the answer field 412), the browser can transmit the question-answer pairs (question-answer attributes) to the profile manager 118. The profile manager 118 can then store the question-answer pairs in the attributes database 136 in reference to the user.

Figure 4B:
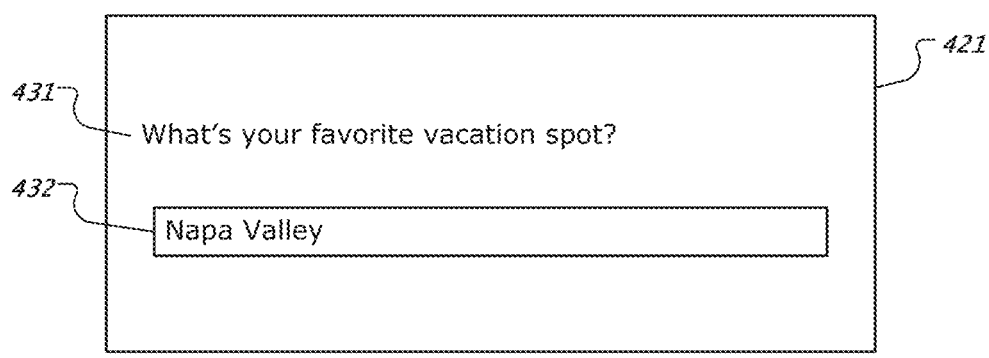

In some instances, the profile manager 118 can post a question submitted by a first user to a second user. The second user can be another user in the first user's group. In various implementations, the second user can be a user currently not in the first user's group, but may be added to the first user's group based on the second user's answer to the first user's question. The profile manager 118 can post the question submitted by the first user to the second user, for example, in another user profile form 421 illustrated in FIG. 4B. The profile manager 118 can create the user profile form 421 including a question proposed by the first user 431 (e.g., "What's your favorite vacation spot?"), and transmit the user profile form 421 to the second user's client device. The second user can enter an answer 432 (e.g., "Napa Valley") in the user profile form 421 displayed by a web browser running on the second user's client device. The browser can transmit the question-answer pair (question-answer attribute) to the profile manager 118. The profile manager 118 can then store the question-answer pair in the attributes database 136 in reference to the second user. The system 122 can determine whether (and how) two users are similar based on the question-answer attributes and other attributes (described further below).

In certain implementations, because any user's identity and messages submitted through his/her account are anonymous to another user of the system 122, a user cannot identify and determine membership of a group of like users. Instead of allowing every user in the system 122 to have access to every other user's submitted messages, in some cases, the system 122 automatically and dynamically determines membership of a group of like users that are similar and can share submitted messages.

In reference to FIG. 1, the group manager 114 is a software component that may determine membership of a group of users of the system 122. Each user in a given group may be permitted to view anonymous messages submitted by others in the group and to submit messages through their respective account for viewing by the other users. For example, the group manager 114 can identify a group of users that are similar to a given user based on a likeness function. The likeness function can calculate a likeness score that indicates how alike one user is to another based on a comparison of the attributes of the two users. In this way, the group manager 114 (or another software component of the system 122) can select one or more attributes, or use different sets of attributes, to filter all users of the system 122 into different groups of like users. For example, the group manager 114 can determine a group of like users that have similar attributes in employment (e.g., programmers who have been with a startup in San Francisco for 3 years). The group manager 114 can further filter these programmers into groups of like users with similar attributes, e.g., programmers who have been with a startup in San Francisco for 3 years and love dogs, programmers who have been with a startup in San Francisco for 3 years and love cats, and programmers who have been with a startup in San Francisco for 3 years and do not like pets at all. In various implementations, the group manager 114 can determine a first group of like users based on a first set of attributes (e.g., programmers in San Francisco), and determine one or more particular question-answer attributes that can filter the first group of like users into distinct subsets of like users (e.g., programmers in San Francisco who like Coke, programmers in San Francisco who like Pepsi, programmers in San Francisco who like smoothies, etc.). The group manager 114 (and/or the profile manager 118) can post one or more questions for the particular question-answer attributes (e.g., "What is your favorite drink?") to other users of the system 122 (e.g., other programmers in San Francisco, or users that work in San Francisco) to identify groups of like users. That is, the system 122 can construct and post questions to a user (e.g., to determine question-answer attributes) based on other attributes (e.g., job attribute, location, etc.) of the user.

In certain implementations, the likeness score can be a numerical value or an indication of the degree to which two users are alike (e.g., "very alike," "somewhat alike," "not alike," etc.). For example, if the likeness score is a numerical value is between 0 and 1 inclusive, then the value 0 indicates that the users are not alike, the value 1 indicates that the users are very alike, and a value in between 0 and 1 indicates that the users are more alike (closer to 1) or less alike (closer to 0). Of course, the polarity of the likeness score can be the opposite as well (e.g., 0 indicates that the users are very alike and 1 indicates that the users are not alike). In any case, in some implementations, a likeness score threshold can be used to determine group membership; that is, a likeness score that satisfies a threshold value determines which users are in a given group. In the example above, the threshold can be a value between 0 and 1. In further implementations, membership in a group can be limited to a number of users that are most alike to a given user based on their likeness scores. In this way, the message server 112 can moderate how many users' messages can be seen by the first user (e.g., so as to not overwhelm the first user with too many messages, or a very long conversation thread).

In some implementations, the group manager 114 determines a likeness score of a second user of the system 122 in relation to the first user by representing one or more attributes as a vector in a feature space, where each attribute is an element of the vector and represents a respective feature in the feature space. In some implementations, the likeness score is the cosine distance between the attribute vectors of the two users; that is, the likeness score is a measure of similarity between two vectors (e.g., A and B below) of an inner product space that measures the cosine of the angle between them.

$$\text{similarity} = \cos(\theta) = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

In some implementations, the likeness score is calculated as a weighted cosine distance between the attribute vectors (weight selection is described below). For example, for vectors u and v, with weight vector w, the weighted cosine is:

$$\frac{\sum_i w_i * u_i * v_i}{\sqrt{\left(\sum_i w_i * u_i^2\right) * \left(\sum_i w_i * v_i^2\right)}}$$

Other ways of calculating the likeness score are possible. As another example, given two users with two sets of attributes, the likeness score between the two users can be the cardinality of the intersection of the attribute sets divided by the cardinality of the union of the attribute sets.

In some instances, attributes such as positive responses to messages and banishments of users can likewise be represented as elements of an attribute vector. For example, positive message responses (or "positive signals") and/or negative message responses (or "negative signals") can be represented as vectors for users who authored the messages.

A textual attribute, such as an answer to a question, may be represented as natural language text. For processing efficiency, for example, the system 112 can simplify textual attributes into a representation suitable for inclusion as an element in an attribute vector. In one implementation, this can be accomplished by identifying nouns and other key words in the text and determining which one(s) bests represent the text. The identified nouns/keywords can then be mapped to numerical codes. In another implementation, a bag-of-words model can be used to represent the text of an attribute as a vector where each entry of the vector represents a count of occurrences of a dictionary word in the text. In yet another implementation, words in a sentence are tagged to corresponding parts-of-speech (e.g., noun, verbs, adjectives, adverbs, pronoun, and so on) and the sentence is analyzed by modeling the tags with a hidden Markov model. For example, words tagged as nouns and an adjective describing the tagged nouns in a question (e.g., "What is your favorite vacation destination?") and words tagged as nouns in an answer (e.g., "Mine is Seattle.") can be a question-answer attribute (e.g., favorite vacation destination—Seattle). Other representations of natural language text are possible.

In further implementations, and as described above, the likeness score can be calculated as the weighted cosine distance between the attribute vectors of two users. In some instances, the weights can be determined by the machine learning system 116. For instance, the machine learning system 116 can identify one or more discriminating attributes, and adjust the vectors in the vector space by adjusting weights corresponding to the discriminating attributes. Attributes that are considered more discriminating than others can be given greater weight. For instance, the machine learning system 116 can use a clustering analysis algorithm that clusters users based on respective attributes, and identifies discriminating attributes that influence cluster membership. The clustering analysis algorithm can cluster users by calculating a distance (e.g., cosine distance) between a pair of users based on their respective attributes, and cluster the users based on the distances. As another example, the clustering analysis algorithm can cluster users based on density of user vectors in the attribute vector space. Other example machine learning algorithms for identifying discriminating attributes are possible.

In some implementations, the group manager 114 can determine membership of a group of like users in the system 122 in relation to a user and store the group membership in the group data database 134. The group manager 114 can update the group membership periodically (e.g., every hour, every day at a particular time, etc.) and store the updated group membership in the group data database 134.

The group manager 114 can also determine membership of a group of like users in relation to a user "ad hoc," for example, in response to a user's request for anonymous messages. For example, a client application running on the user's client device can send a request to the message server 112 to receive anonymous messages in one or more conversation threads. The message server 112 can notify the group manager 114 about the user's request. The group manager 114 can update (or create) a group of like users in relation to the first user, and provide the like users in the group to the message server 112. The message server 112 may obtain messages associated with the like users from the messages database 138, strip out any identifying information from the messages, and provide the anonymous messages to the requesting client application. The client application can display to the user the anonymous messages in its user interface. As another example, to find additional like-minded people, a first user can update an attribute (e.g., a job title attribute, an answer to an attribute question, etc.), or create a new attribute (e.g., a question-answer pair) by submitting new attribute information through, for example, user interfaces 300, 401, 421, of a client application running on the first user's client device. The client application can send the new attribute information to the server system 122 to be stored in the attributes database 136. The group manager 114 can update a group of like users in relation to the first user based on the latest attributes stored in the attributes database 136, and store the group membership in the group data database 134.

Figure 5:
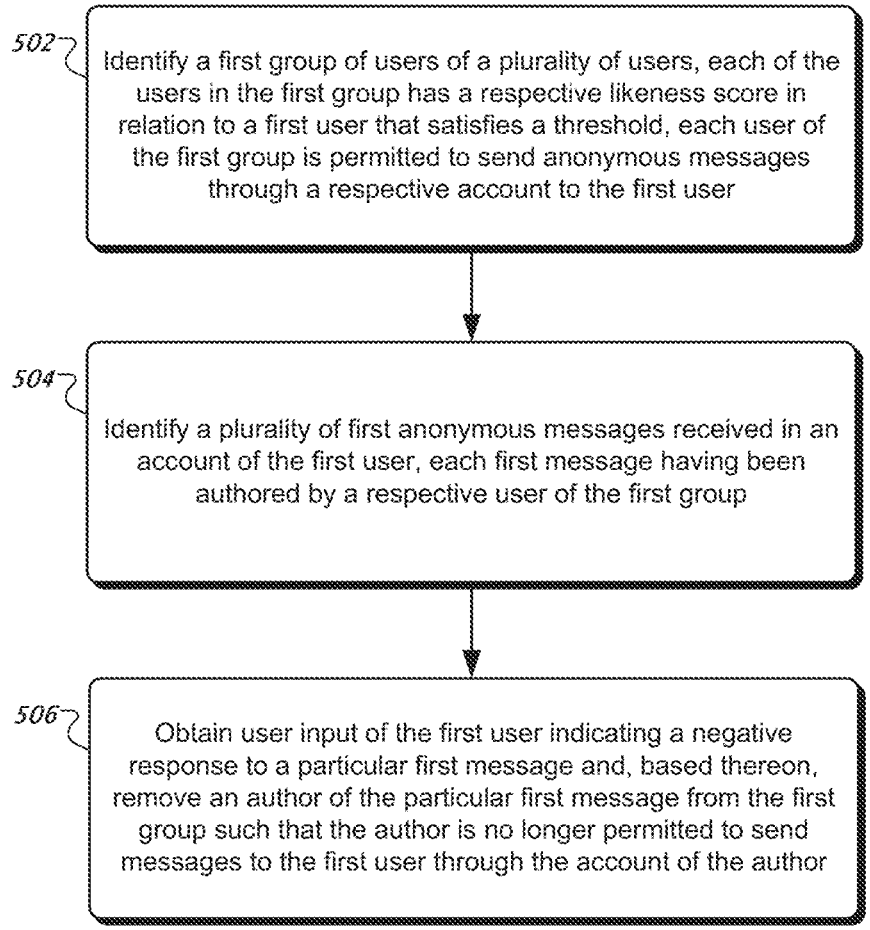
FIG. 5 is a flowchart of an example method for determining a group of like users in relation to a given user.

FIG. 5 is a flow chart of an example method for determining a group of like users in relation to a user of an anonymous content posting system. The method can be implemented using software components executing on one or more data processing apparatus that are part of the data center 121 described above. The method may include identifying a first group of users of a plurality of users, where each of the users in the first group has a respective likeness score in relation to a first user that satisfies a threshold, and where each user of the first group is permitted to send anonymous messages through a respective account to the first user (Step 502). The method may include identifying a plurality of first anonymous messages received in an account of the first user, each first message having been authored by a respective user of the first group (Step 504). The method may include obtaining user input of the first user indicating a negative response to a particular first message and, based thereon, removing an author of the particular first message from the first group such that the author is no longer permitted to send messages to the first user through the account of the author (Step 506).

In various implementations, the techniques described in this application can be used to perform other functions, in addition to or as an alternative to, establishing an anonymous discussion forum. For example, the techniques described herein can be used to establish an anonymous social media platform. In various instances, a single system 122 and/or client application can offer one, some, or all of the functions described herein. For brevity, this disclosure refers to software components that perform similar tasks using the same reference numeral regardless of the function being performed by the system 122 (e.g., establishing an anonymous discussion forum, establishing an anonymous social media platform, etc.); however, in various embodiments system 122 can include separate software components for separate functions. As described above, in some instances users can interact with onboard manager 117 and/or profile manager 118 to provide certain information about themselves to system 122. For example, users can inform the system 122 of their profession/job title. In some cases, users can inform the system 122 of certain skills they have, which may or may not be related to their job, e.g., UI designers, iOS programmers, etc. In addition, users can inform the system 122 of other attributes, which in some cases can be personal characteristics that relates to how the user performs his/her job. A few non-limiting examples include, whether the user is a parent, whether the user is an immigrant, the user's political beliefs, and/or the user's religious beliefs. In some cases, users can also inform the system 122 of their employer.

As described above, upon receiving user information, the group manager 114 can identify other users that are similar to a particular user, e.g., based on the attributes of the particular user. In some instances, system 122 provides to a particular user the other users identified as being similar to the particular user, as potential options of users to "follow." In this disclosure, the term "follow" refers to a concept whereby if a particular user "follows" another user, under certain circumstances (described below), the particular user will be able to view (e.g., on a client device) content posted by the followed user. In various embodiments, other terms could be used by the system in place of the term "follow" (e.g., "listen"). In other instances, upon receiving user information, the system 122 may automatically have the particular user follow (i.e., "listen to") a group of other users. The determination of which other users will be automatically followed by the particular user may be based on an attribute (e.g., job title) of the particular user. For example, if a particular user is a founder, the system 122 may have the particular user automatically follow other founders (or, in some cases, other job titles: designers, etc.) The particular user may then be given the option to un-follow (i.e., stop "listening to") certain users, or groups of users.

Figure 6:
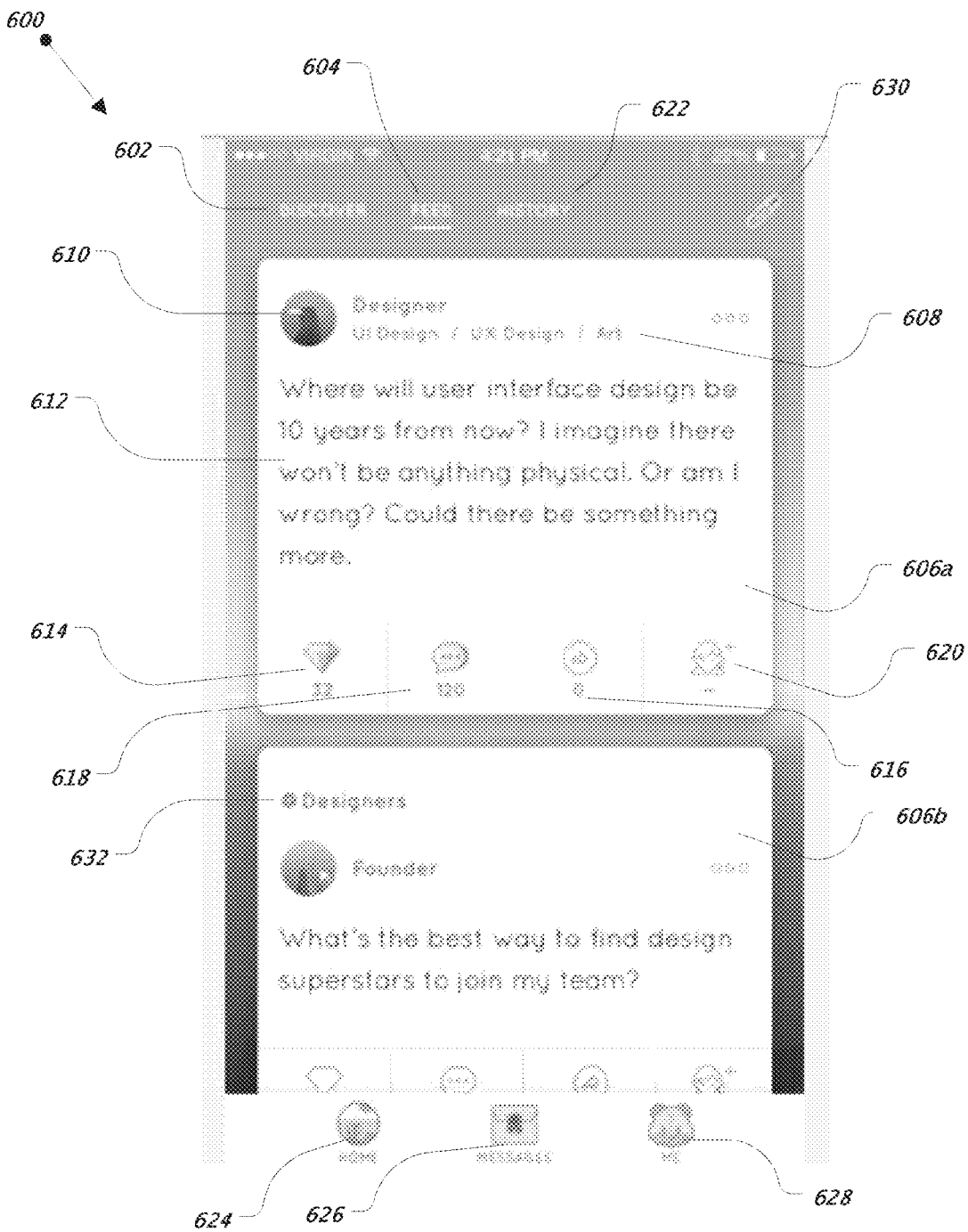
FIG. 6 illustrates an example user interface for an anonymous social media platform.

FIG. 6 illustrates an example user interface 600 that can be provided to users engaging an anonymous social media platform. FIG. 6 and other figures presenting user interfaces in this application include example labels that refer to various features displayed by the user interface (e.g., discover, feed, history, etc.). While such labels will be used to reference and describe such features in this application, the features may be presented with different labels as well. The interface 600 can include a discover tab 602 that, when selected by a user, presents the user with potential options of other users to follow. In some implementations, the potential options of users to follow are presented without revealing their identity. For example, the discover tab 602 may present the user with certain attributes of potential users to follow (e.g., job title, parental status, etc.), and in some cases a temporary avatar, but not the identities (e.g., real names, or other information allowing an identity to be determined) of the potential users. As one example, a user whose attributes include being a designer, a parent, and an immigrant, may be presented with the following other users in the discover tab 602: (i) a designer, a parent, and not an immigrant; (ii) a designer, an immigrant, and not a parent; and (iii) a designer, a parent, and an immigrant. The user may then select which other users it wants to "follow." For example, the user may select to follow user (i) and user (iii), but not user (ii).

In various implementations, user interface 600 may also include a feed tab 604. In some instances, when selected by a user, feed tab 604 displays content (e.g., message postings) to the user. The message postings may be from other users the user follows, or in some cases from other users the user does not follow. As described in more detail below, which messages are presented in the feed tab 604 can be dependent upon selections made by the message poster upon posting the message. In general, the feed tab 604 can display content in any manner that allows users to view the posted material. For example, as shown in FIG. 6, each message posting 606a, 606b can be displayed as an entry on a vertical scroll. In some instances, the message postings 606a, 606b are presented to other viewers without revealing the identity of the message poster. In some such cases, each message posting includes a header 608 including non-identity revealing information related to the source of the message, e.g., particular attributes of the message poster. The message posting may also include a generic avatar 610 as another way to identify the source of the message. Beneath the header 608 may be the content 612 of the message (e.g., text, image, video, other multimedia, etc.).

In some instances, the message posting may include a feedback icon 614 (e.g., a diamond) that can be selected by viewers to indicate approval (or in some cases disapproval) of the posting. In some instances, the message posting may include a repost icon 616, which when selected by a user results in the message posting being reposted by the selecting user.

Figure 7:
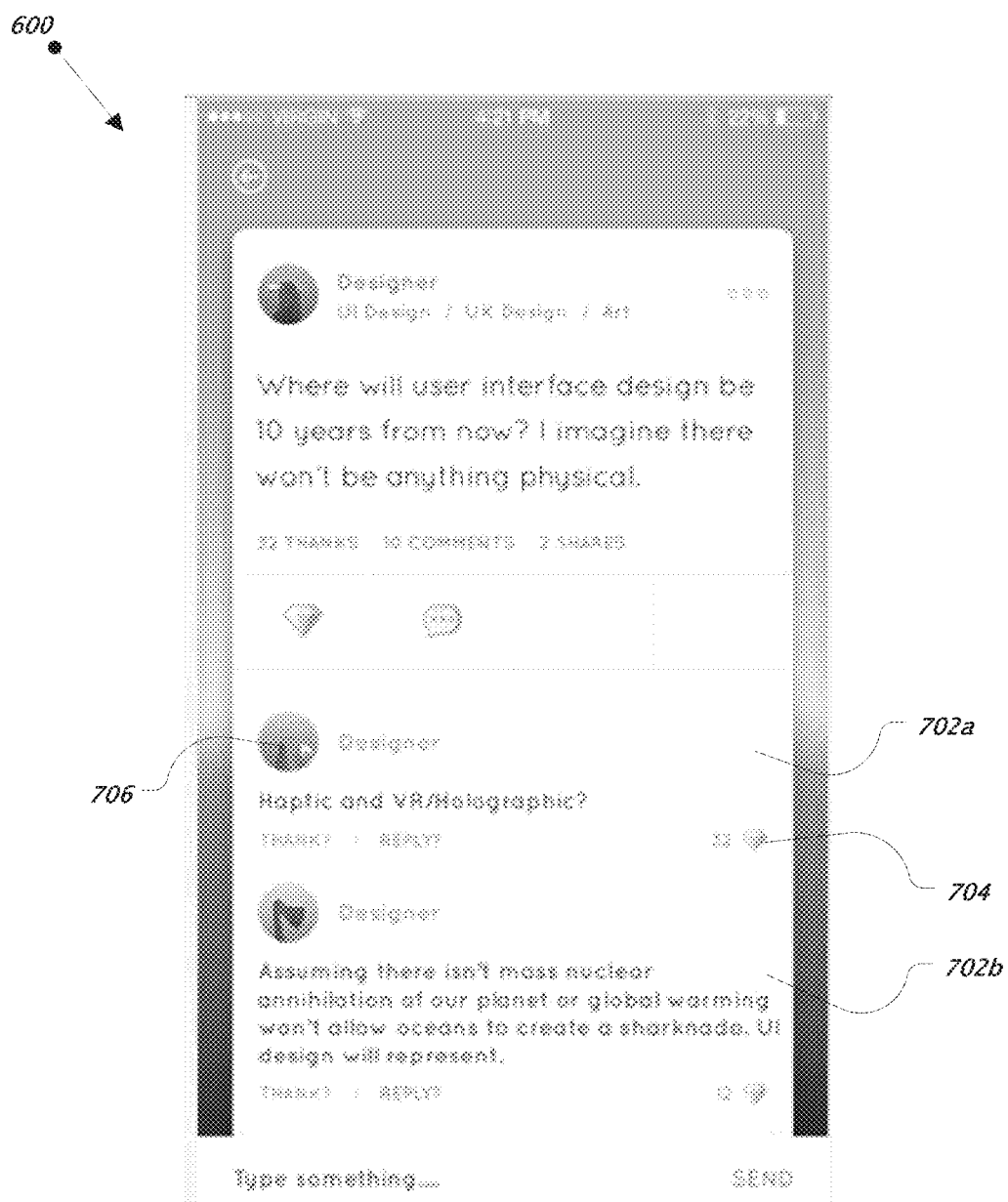
FIG. 7 illustrates an example user interface showing comment postings on a message posting.

In some instances, the message posting includes a comment icon 618 which, when selected by a user, allows the user to post a comment in reply to the message posting. FIG. 7 illustrates an example appearance of user interface 600 when users have posted comments 702a, 702b on a particular message posting. Each comment posting 702a, 702b can include its own feedback icon 704, such that viewing users can provide feedback on the comment postings, separate from the message posting itself. In some instances, the comment postings 702a, 702b are also presented to other viewers without revealing the identity of the comment poster. For example, each comment posting may also include a generic avatar 706 associated with the comment posting. In some instances, a particular user may view a comment posting (or in some cases, a message posting) made by another user that the particular user does not follow. In some such instances, the particular user can elect to follow the other user even if the other user is not presented by system 112 as a suggested user to follow (e.g., in discover tab 602). In some cases, the system 112 may suggest to a particular user as a potential user to follow (e.g., by presenting the user in the particular user's discover tab 602), a user that comments on message postings by users the particular user does follow.

In some instances, if a comment poster posts multiple comment postings on the same message posting, the same generic avatar 706 will be associated with each comment posting, such that viewers will know all of the content for a particular message posting that is provided by a single user. However, in some cases, if that same user posts a comment posting on a different message posting, a different avatar may be used. Similarly, if the original message poster posts a comment posting on his/her message, the same avatar 610 associated with the original message posting may be associated with the comment posting. However, in some cases, if the original message poster posts a different message posting, a different avatar may be used. In other cases, the same avatar may be used for all message postings and/or comments posted by a particular user.

Message postings 606a, 606b may also include an invite icon 620 which, when selected by a user, allows a user to invite another user (e.g., a user for which the message posting would not normally appear on his/her feed tab 604) to comment on a particular message posting. In some cases, the invite icon 620 may be presented on a comment posting 702a, 702b. In some implementations, the system 122 may track each time a feedback icon 614, repost icon 616, and/or comment icon 618 is selected for a particular message posting. In some such implementations, the user interface 600 may display such numbers on the message postings. For example, in FIG. 6, the feedback icon 614 has been selected 32 times, the comment icon 618 has been selected 120 times, and the repost icon has been selected 0 times.

In various implementations, user interface 600 may also include a history tab 622. The history tab 622 may generally display content that for various reasons is no longer displayed in the feed tab 604. In general, content (e.g., message postings) may be relocated from the feed tab 604 to the history tab 622 whenever the content becomes less relevant, for example, if it has been posted for a particular amount of time (e.g., 3 days), and/or if it has not received attention from users (e.g., feedback icon selection, comment postings. etc.) for a particular amount of time. In some instances, users can search content in the history tab 622 (e.g., via keyword). In some instances, e.g., if a particular user discovers a posting in the history tab 622 for which there is interest in generating additional discussion/commentary, the particular user can cause a posting in the history tab 622 to be presented (or in some cases, re-presented) in the feed tab 604 of other users. This action may be performed by selecting the repost icon 616, or another icon.

Various implementations of the system 112 may present content (e.g., message postings) in various orders to content viewers. For example, in some instances, the order in which content is presented can be a function of time (e.g., the newest posts appearing at the top of the feed). In other instances, the order in which content is presented can be based on the reputation of the poster. A poster's reputation can be based on the feedback the poster has received on prior posts. For example, the reputation can be based on the number of "Thank you," "No thanks," or other selections of the feedback icon 614. In some cases, there can be multiple levels of positive (or negative) feedback indicating that a particular post was distinctive (e.g., candid, thoughtful, inspiring, etc.). In such cases, a reputation can be additionally positively (or negatively) affected beyond the effect of standard feedback, based on receipt of such distinctive feedback. In other cases, a poster's reputation can be based on the context in which the user received feedback. The context in which a user receives feedback can include the number of comments on a posting and/or the total amount of feedback received on a particular posting and its associated comments. For example, feedback received on a comment in a list of many (e.g., 100) comments, can have a greater effect on a reputation than feedback received on a comment in a list of a few (e.g., 3) comments. As another example, feedback received on a comment in a list of many comments on which no (or little) other feedback is received, can have a greater effect on a reputation than feedback received on a comment in a list of many comments on which large amounts of feedback is received.

In these instances, posts can be presented at a location on other users' feeds based on the poster's reputation (e.g., posts from posters with higher reputations at higher locations, and posts from posters with lower reputations at lower locations). In some cases, the reputation of a user can be categorized within a particular attribute (e.g., a job title). For example, a particular user may have a high reputation for a founder, and the system 112 may favor presenting that user's posts to certain users (e.g., other founders, or other users interested in founders, for example, as determined by their interactions with founder's posts), but not favor presenting the user's posts to other users (e.g., designers, or other users not interested in founders).

In some cases, the reputation of a user can be categorized within a particular topic. In order to do this, the posting user and/or an administrator of the system 112 may assign a topic tag to at least some of the posts made using the system 112. By tracking the feedback received on each post, as well as the topic tag assigned to each post, a reputational score can be developed for a particular user in relation to a particular topic. For example, a particular user may receive a large amount of positive feedback for his/her posts regarding fundraising, but less feedback (or less positive feedback) for his/her posts regarding recruiting. As a result, the user may be assigned a high reputational score for fundraising and a low reputational score for recruiting. Such topic-based tagging of posts, and topic-based reputational scores, can be used by the system 112 to determine how to present content to other users. For example, if a particular user interacts often with fundraising tagged content, the system 112 can present the particular user with more content from other user's that have a high reputational score related to fundraising. In some cases, the content presented from other user's with a high reputational score related to a topic a particular user is interested in, need to not relate to the particular topic. For example, if a particular user is interested in fundraising, the system 112 may present the user with the posts from another user that has a very high reputational score related to fundraising topics, even if the particular post being presented from the other user relates to another topic (e.g., recruiting).

Calculation of the reputation of a particular user can be based on the amount of feedback received by the user's posts, the topic tag assigned to the posts, as well as the attributes and/or reputation of the other user's providing the feedback. For example, if a user receives a large amount of positive feedback on a post regarding fundraising, the user's reputational score for fundraising may increase. But, for example, if a first user and a second user receive the same amount of feedback for a post regarding fundraising, and the first user receives feedback from primarily user's that have a high fundraising reputational score, and the second user receives feedback from primarily user's that do not have a high fundraising reputational score, then first user's fundraising reputational score may increase more than the second user's fundraising reputational score, based on the reputations of those users providing feedback. A similar concept can be applied to attribute-based (e.g., job title) reputation. For example, if a first user and a second user receive the same amount of positive feedback on a particular post, but the first user receives more positive feedback from founders, than the second user, then the first user's reputational score among founders may increase more than the second user's reputational score among founder. Similar concepts can be applied to other attribute-based and topic-based reputational scores.

One example technique for calculating a reputational score of a user, applying some of the concepts described above is as follows. For a particular topic, the system 112 may assign each user an initial score based on the number of other users that provided feedback (e.g., "thanked") the user regarding that topic. For example, for the topic of fundraising, if User A was "thanked" by 50 other people and User B was thanked by 10 other people, then User A can be assigned an initial score of 50, and User B can be assigned an initial score of 10. Once the initial score is assigned, a particular user's score can be dispersed to other users that received feedback from the particular user regarding the relevant topic, e.g., such that the other users' scores are affected proportional to the reputational score of the particular user. For example, if User A thanked 10 people regarding fundraising, then each person User A thanked could have their reputational score increased by:

User A's initial score/the number of users User A provided feedback to

Applying the above equation to this example would result in 50/10=5. Thus, if User A thanked User B regarding a fundraising post, User B's reputational score for fundraising would be increased 5 points to 15. This process can then be repeated in iterations. For example, User B's reputational score can then be dispersed to the other users that User B provided feedback to regarding fundraising. In some cases, the effect of User B's feedback can be decreased by a multiplier to reflect that it is being applied in a subsequent iteration. For instance, if User B thanked 2 users—User C and User D—for posts regarding fundraising, then User C and User D could have their reputational scores increased by:

(User B's initial score/the number of users User B provided feedback to)×(a subsequent iteration multiplier)

Using an example subsequent iteration multiplier of 0.5, applying the above equation to this example would result in (15/2)×0.5=3.75. Thus, User C and User D could have their reputational scores for fundraising increased by 3.75. A predetermined number of iterations (e.g., 4) can occur, with the subsequent iteration multiplier being decreased for each iteration. A similar example technique can be applied to determine an attribute-based reputational score (as opposed to a topic-based one). In addition to tracking a user's topic-based and/or attribute-based reputational scores; in some implementations, the system 112 may aggregate the reputational scores of a user across all topics (or attributes) to determine an aggregate reputational score for each user.

In other instances, content can be presented based on the reputation of a particular post (as opposed to the reputation of the poster). For example, if a user indicates an interest in fundraising topics, the posts having a fundraising topic tag can be presented in an order based on the feedback they have received (e.g., posts with the most positive feedback first). The various techniques for presenting content (e.g., time-based, poster-reputation-based, post-reputation-based, etc.) can be executed by the system 112 simultaneously, or as alternatives to one another. In instances in which the various techniques (or subsets thereof) are executed simultaneously, a user can toggle between different feeds that present the content using the various techniques. For example, a first feed may present the newest content first, a second feed may present content based on the reputation of the posters for a particular topic the user is interested in, and the third feed may present content based on the reputation of the posts for a particular topic the user is interested in.

In various implementations, user interface 600 may include a home screen (e.g., presented upon election of home icon 624) that allows users to toggle between the discover tab 602, the feed tab 604, and the history tab 622. User interface 600 may also include a private messages screen (e.g., presented upon election of messages icon 626) that allows the user to view and exchange private messages with other users. A private message may be a message that cannot be commented on or interacted with by any users other than the users exchanging the private message. User interface 600 may also include a profile ("Me") screen (e.g., presented upon election of the "Me" icon 628) that allows a user to edit the information provided to the system 122 (e.g., job title, skills, and/or other attributes).

Figure 8:
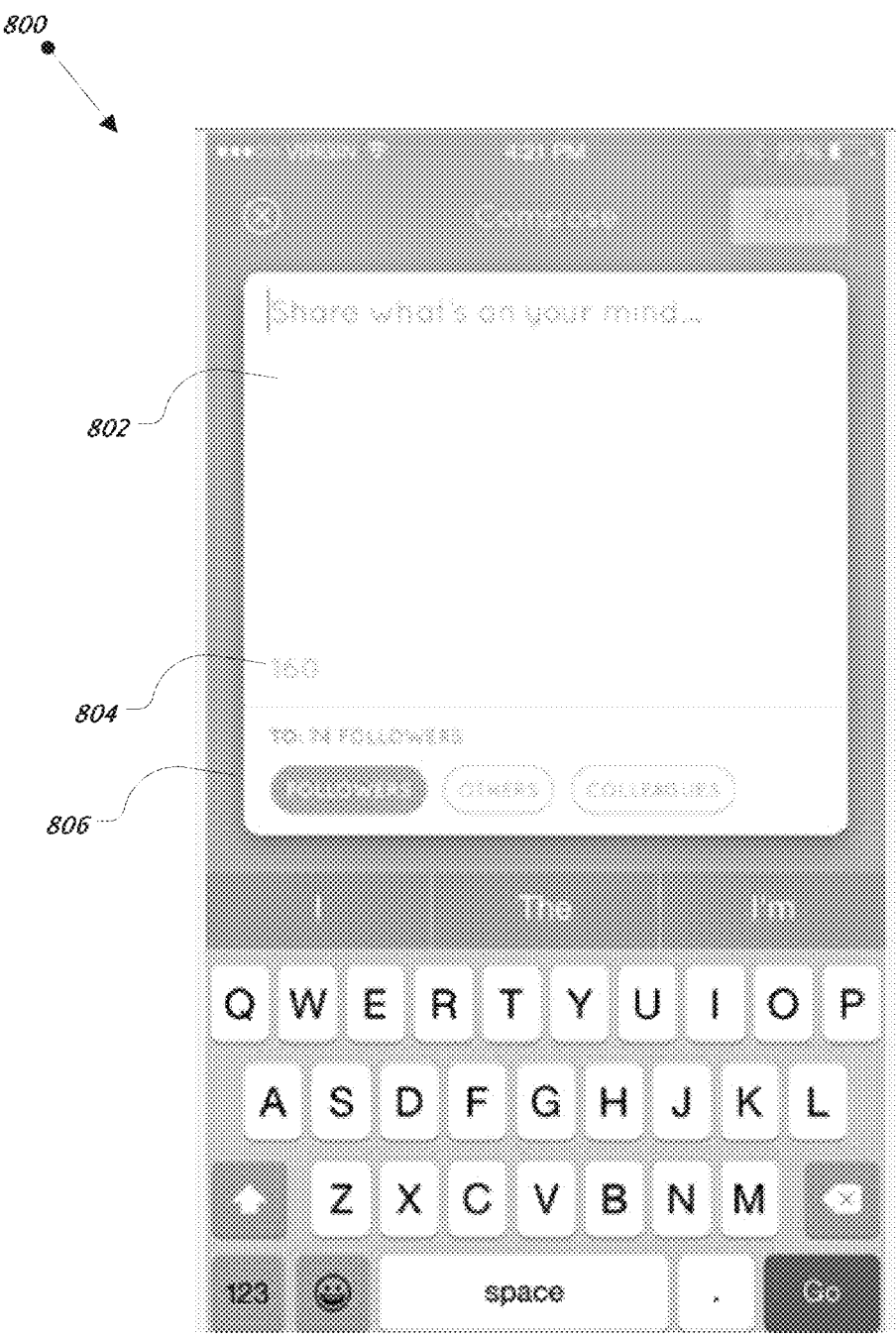
FIG. 8 illustrates an example user interface for generating content.

In various implementations, the social media platform established by system 622 can enable users to create content (e.g., messages) to be posted. In some instances, user interface 600 can present a compose icon 630, upon selection of which a user is provided the ability to generate content to be posted. FIG. 8 illustrates an example user interface 800 that enables a user to generate content. In some instances, the user interface 800 may include a content field 802 (e.g., a text box) into which a user may insert a message (or in some cases in which a spoken message appears after being processed by voice recognition software). In other instances, other content types (e.g., image, video, other multimedia content, etc.) can be inserted. In some cases, the system 122 places a limit on the size of a particular content post (e.g., a character limit for text message postings). In such cases a content limit icon 804 can display the available content remaining (e.g., number of characters). In other cases, no limit is placed on the size of a particular content post.

In certain implementations, a posting user can select other users of system 122 that can view the content posting (e.g., which users will have the content posting appear on their feed tab 604). In some instances, user interface 800 may include a viewer identifier portion 806 which a user can engage to perform such identifications. In general, a posting user can select any and all users of system 122, including any subsets thereof, to view a particular message content posting. What follows are descriptions of illustrative, but by no means exhaustive, examples of viewers that can be identified in various embodiments.

Figure 9:
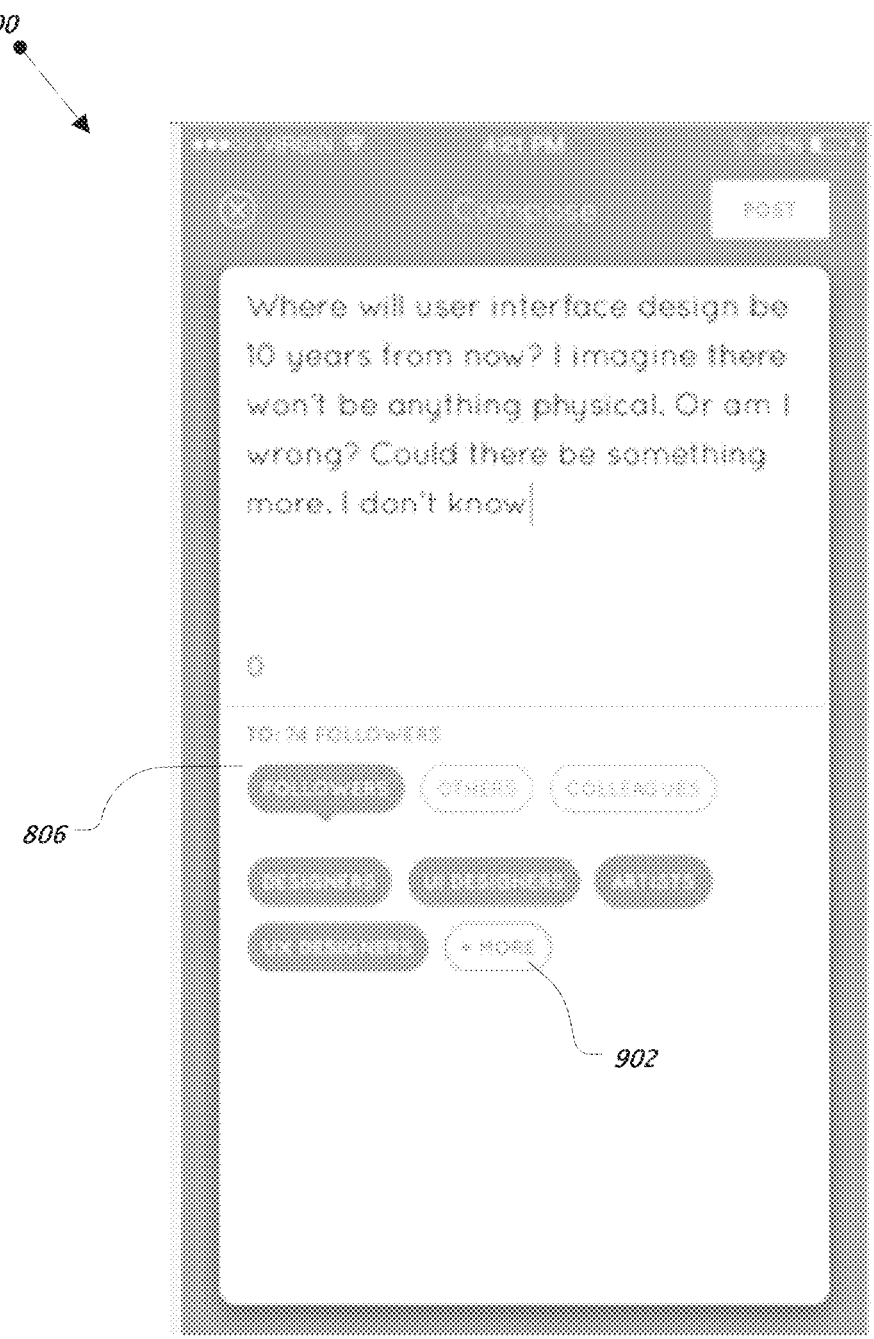
FIG. 9 illustrates an aspect of an example user interface for selecting the viewers of a particular content posting.

As shown in FIG. 8, in some instances, a posting user can select other users that follow the posting user ("followers") as the viewers of a particular content posting. In some cases, this means that the content posting will appear on the feed tab 604 of any users that follow the posting user. In some cases, a posting user may further limit the viewers of a particular content by selecting only particular subsets of categories of users. An example of this concept is shown in FIG. 9; in addition to limiting the viewers to followers, the posting user may further limit the viewers to those followers that have particular attributes, for example, a particular job title (e.g., designers) or particular skills (e.g., UI designers, artists, UX designers, etc.). As shown, for example, in FIG. 9, a posting user may select categories (and subcategories) of viewers by, for example, selecting icons identifying user subsets. In some cases, system 122 may determine certain categories and subcategories of viewers likely to be identified by the posting user, and present such icons to the posting user in user interface 800. In some cases, if the user wishes to select user subsets not presented via an icon, he or she can indicate a desire to be given additional options, e.g., by selecting a "+more" icon 902. Upon selecting the "+more" icon 912, a user may be presented with more user subsets (e.g., parents, immigrants, etc.), or in some cases may be given the option to search for other user subsets (e.g., a textual search by subset name). In certain implementations, each of the user subsets presented as subcategories under the follower category in FIG. 9, can be identified as categories as well. As one example, a posting user that is a designer may select all designers as viewers, regardless of whether they are followers.

Figure 10:
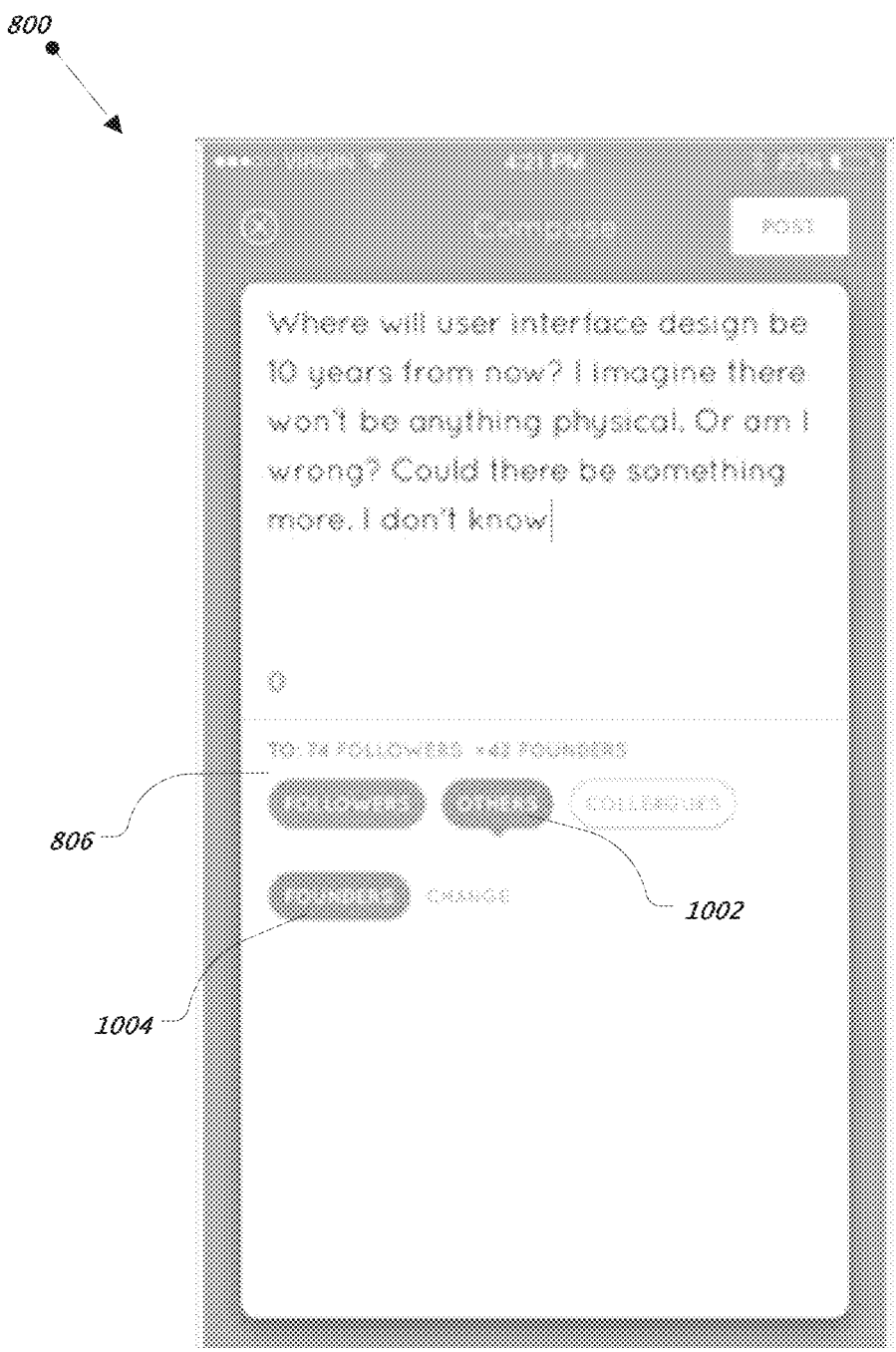
FIG. 10 illustrates another aspect of an example user interface for selecting viewers of a particular content posting.
Figure 11:
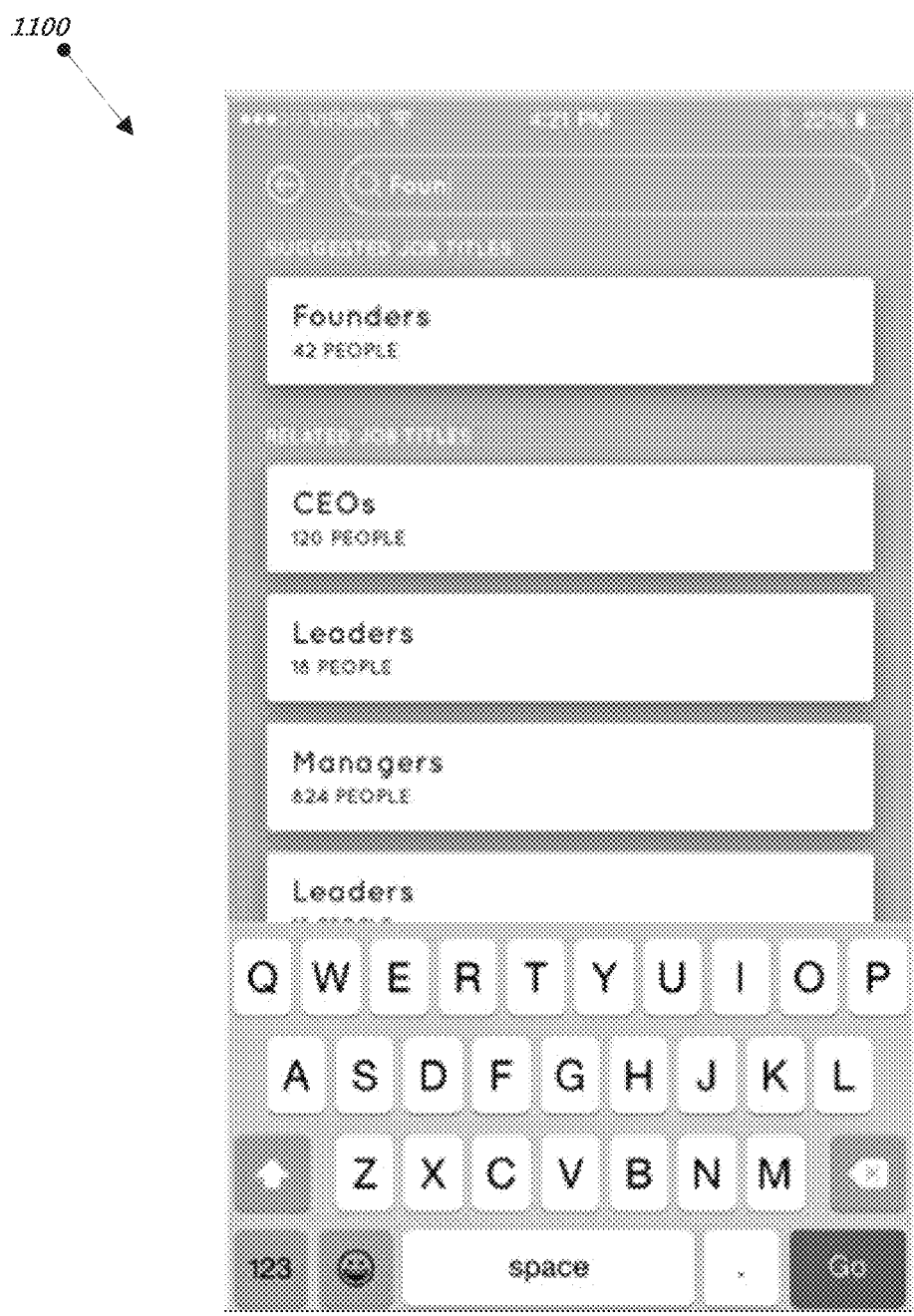
FIG. 11 illustrates an example user interface for searching for user subset groups to select as viewers of a particular content posting.

In other instances, a posting user can select user subsets other than followers as viewers. In order to do so, in one example, the user may select an "others" icon 1002 (FIG. 10) included in user interface 800. Once selected, the user can then select other user subsets (e.g., by selecting an icon 1004 identifying the other user subset) to view the content posting. Similar to the process outlined above, categories or subcategories can be presented to the posting user, and/or the user may perform searches for particular user subsets. FIG. 11 illustrates an example user interface 1100 that a posting user can engage to search for user subsets. In some cases, the system 122 can suggest additional user subsets (e.g., job titles) that the posting user may be interested in selecting. In some situations, selecting viewers other than followers can be useful for a posting user that desires the input of a subset of users that do not (or are unlikely to) follow the posting user. For example, consider the example of a posting user that is a designer and is followed by primarily other designers. Imagine the designer wants to post a question regarding the future of interface design, and is interested in the input of founders because they may be more focused on the future of technologies than other designers. In implementations of the present disclosure, the posting user can select founders as viewers of the question, even if the founders are not followers of the designer. User subsets other than followers can be identified as viewers in addition to, or in some cases as an alternative to, followers.

As discussed above, in some implementations, selecting a user as a viewer results in the content posting appearing on the identified user's feed tab 604. In some instances, the identified users may include a very large number of users. For example, selecting all founders as viewers may result in thousands or even millions of users being identified. In such instances, the system 122 may only post the content posting on a portion of the identified user's feed tabs. The portion may be determined randomly, or in some cases based on a degree of similarity and/or connection with the posting user (e.g., based on attributes, geographic location, etc.).

Referring again to FIG. 6, in implementations in which content appearing on a particular user's feed tab may include postings made by other users the particular user follows and other users the particular user does not follow, user interface 600 can visually differentiate between these different types of posts. In general, the user interface 600 can differentiate the posts in any way that enables the particular user to appreciate the difference in source. For example, posts from users not followed by the particular user may include an additional heading 632. As other examples, different shading, styles, color schemes, and/or avatar themes can be used to differentiate posts from different sources.

Figure 12:
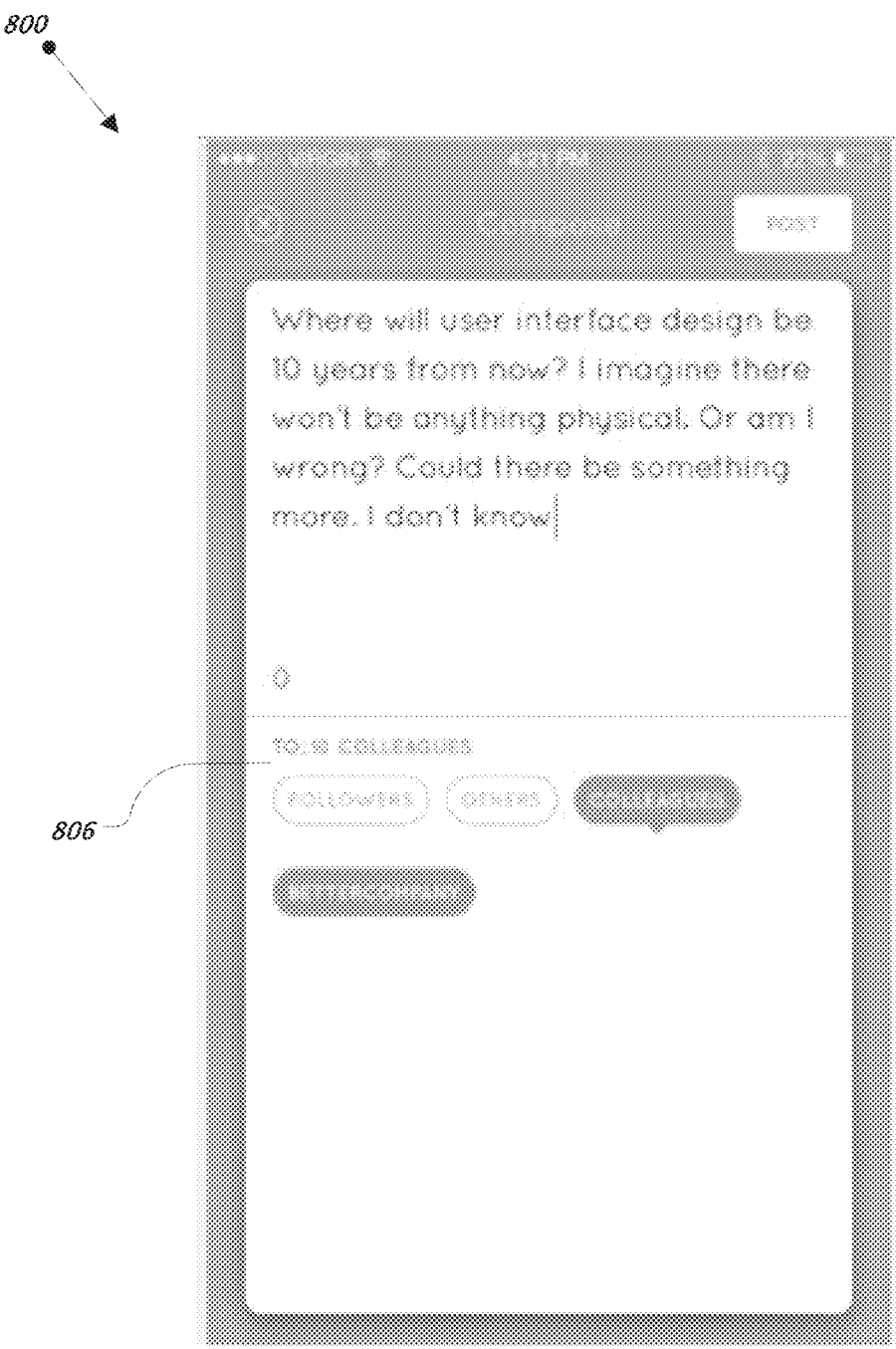
FIG. 12 illustrates another aspect of an example user interface for selecting viewers of a particular content posting.

In still other instances, a posting user can select colleagues as viewers. As stated above, one item of information a user can provide system 122 is their employer. In such instances, an identified category of viewers can be a posting user's colleagues, regardless of whether the colleagues are followers of the posting user. FIG. 12 shows an example viewer identifier portion 806 upon selecting colleagues as viewers (in this example, the employer is a company named "BetterCompany"). For a posting user with multiple employers, multiple identification options may be provided. Of course, as described above, this category can be further limited to subcategories as well (e.g., a user can select as viewers, other users that are colleagues, designers, and parents). Similar to visual differentiation between posts from a followed and a non-followed user described above, user interface 600 can employ similar techniques to differentiate posts from colleagues. The above describes only a limited subset of example categories/subcategories of viewers that can be identified. Many other examples are possible.

Operating Apparatus

Figure 13:
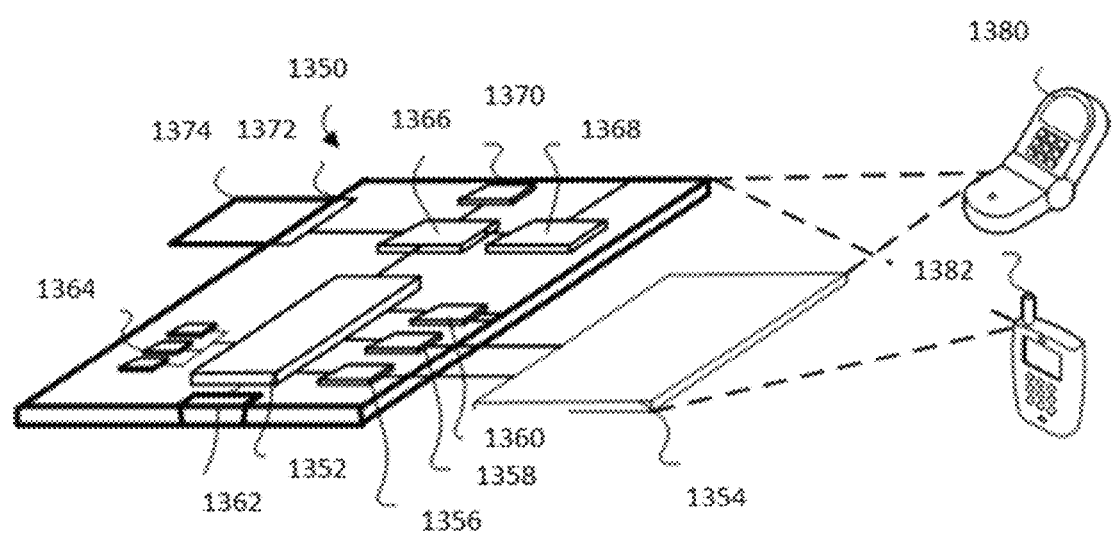
FIG. 13 illustrates an example client device that can be used in certain implementations of the disclosure.

FIG. 13 shows an example of a generic computing device 1350, which may be used with some of the techniques described in this disclosure (e.g., as client device 120*a*, 120*b*, 120*c*). Computing device 1350 includes a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT LCD (Thin-Film-Transistor Liquid Crystal Display) or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be provided in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be provided as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, memory on processor 1352, or a propagated signal that may be received, for example, over transceiver 1368 or external interface 1362.

Device 1350 may communicate wirelessly through communication interface 1366, which may include digital signal processing circuitry where necessary. Communication interface 1366 may in some cases be a cellular modem. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, WiFi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in FIG. 13. For example, it may be implemented as a cellular telephone 1380. It may also be implemented as part of a smartphone 1382, smart watch, personal digital assistant, or other similar mobile device.

Operating Environment

Some implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
performing by one or more computers:
identifying a first group of users of a plurality of users wherein each of the users in the first group has a respective likeness score in relation to a first user that satisfies a threshold, and wherein each user of the first group is permitted to send anonymous messages through a respective account to the first user;
identifying a plurality of anonymous messages received in an account of the first user, each anonymous message having been authored by a respective user of the first group and, via a user interface, including a selectable icon for the first user to provide a positive response to the anonymous message and a different selectable icon for the first user to provide a negative response to the anonymous message; and
in response to receiving a user input of the first user with a selection of the icon indicating the negative response to a particular anonymous message, removing an author of the particular anonymous message from the first group such that the author is no longer permitted to send anonymous messages to the first user through the account of the author.

2. The method of claim 1, further comprising:
after removal of the author from the first group, determining respective likeness scores of one or more particular users in relation to the first user and, based thereon, adding the particular users to the first group or removing the particular users from the first group.

3. The method of claim 2, wherein removing the particular users from the first group further comprises:
determining that respective likeness scores of the particular users no longer satisfy the threshold and, based thereon, removing the particular users from the first group such that the removed particular users are no longer permitted to send messages to the first user through their respective accounts.

4. The method of claim 2, wherein adding the particular users to the first group further comprises:
determining that a second group of one or more of the plurality of users have respective likeness scores that satisfy the threshold after removal of the author from the first group; and
adding the second group of users to the first group of users such that each user of the second group is permitted to send anonymous messages through a respective account to the first user.

5. The method of claim 2, wherein determining the respective likeness scores of the particular users in relation to the first user, comprises:
identifying one or more discriminating attributes;
obtaining a weighted vector of attributes for the first user and for each of the particular users;
adjusting a respective weight of the discriminating attributes in each of the vectors; and
calculating the respective likeness score of each of the particular users as a difference between the weighted vector of attributes of the particular user and the weighted vector of attributes of the first user.

6. The method of claim 5, wherein identifying one or more discriminating attributes comprises identifying one or more discriminating attributes of the author.

7. The method of claim 5, wherein identifying the discriminating attribute comprises clustering the plurality of users based on respective attributes of the users to identify the discriminating attributes that influence cluster membership.

8. The method of claim 7, wherein clustering comprises:
for different pairs of users of the plurality of users, calculating a respective distance between the users of the pair based on the respective attributes of the users in the pair; and
clustering users based on the distances.

9. The method of claim 5, wherein a particular attribute comprises one or more respective anonymous answers, submitted through respective accounts of the particular users to one or more questions submitted through the account of the first user.

10. The method of claim 5, wherein a particular attribute comprises a profession, a company, time of employment, location of employment, or an attribute that is unrelated to employment.

11. The method of claim 5, wherein a particular attribute comprises a respective positive response to an anonymous message through an account of a user.

12. A system comprising:
one or more computers programmed to perform operations comprising:
identifying a first group of users of a plurality of users wherein each of the users in the first group has a respective likeness score in relation to a first user that satisfies a threshold, and wherein each user of the first group is permitted to send anonymous messages through a respective account to the first user;
identifying a plurality of anonymous messages received in an account of the first user, each anonymous message having been authored by a respective user of the first group and, via a user interface, including a selectable icon for the first user to provide a positive response to the anonymous message and a different selectable icon for the first user to provide a negative response to the anonymous message; and
in response to receiving a user input of the first user with a selection of the icon indicating the negative response to a particular anonymous message, removing an author of the particular anonymous message from the first group such that the author is no longer permitted to send anonymous messages to the first user through the account of the author.

13. The system of claim 12, wherein the operations further comprise:
after removal of the author from the first group, determining respective likeness scores of one or more particular users in relation to the first user and, based thereon, adding the particular users to the first group or removing the particular users from the first group.

14. The system of claim 13, wherein removing the particular users from the first group further comprises:
determining that respective likeness scores of the particular users no longer satisfy the threshold and, based thereon, removing the particular users from the first group such that the removed particular users are no longer permitted to send messages to the first user through their respective accounts.

15. The system of claim 13, wherein adding the particular users to the first group further comprises:
determining that a second group of one or more of the plurality of users have respective likeness scores that satisfy the threshold after removal of the author from the first group; and
adding the second group of users to the first group of users such that each user of the second group is permitted to send anonymous messages through a respective account to the first user.

16. The system of claim 13, wherein determining the respective likeness scores of the particular users in relation to the first user, comprises:
identifying one or more discriminating attributes;
obtaining a weighted vector of attributes for the first user and for each of the particular users;
adjusting a respective weight of the discriminating attributes in each of the vectors; and
calculating the respective likeness score of each of the particular users as a difference between the weighted vector of attributes of the particular user and the weighted vector of attributes of the first user.

17. The system of claim 16, wherein identifying one or more discriminating attributes comprises identifying one or more discriminating attributes of the author.

18. The system of claim 16, wherein identifying the discriminating attribute comprises clustering the plurality of users based on respective attributes of the users to identify the discriminating attributes that influence cluster membership.

19. The system of claim 18, wherein clustering comprises:
for different pairs of users of the plurality of users, calculating a respective distance between the users of the pair based on the respective attributes of the users in the pair; and
clustering users based on the distances.

20. The system of claim 16, wherein a particular attribute comprises one or more respective anonymous answers, submitted through respective accounts of the particular users to one or more questions submitted through the account the first user.

21. The system of claim 16, wherein a particular attribute comprises a profession, a company, time of employment, location of employment, or an attribute that is unrelated to employment.

22. The system of claim 16, wherein a particular attribute comprises respective positive response to an anonymous message through an account of a user.

* * * * *